United States Patent
Combs et al.

(10) Patent No.: US 7,908,414 B2
(45) Date of Patent: Mar. 15, 2011

(54) DETECTING BY USB CLIENT DEVICE A CONNECTION TO HOST USB DEVICE WHEREIN POWER IS NOT SUPPLY FROM HOST USB DEVICE TO USB CLIENT DEVICE

(75) Inventors: James Lee Combs, Lexington, KY (US); David Allen Crutchfield, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 584 days.

(21) Appl. No.: 11/380,065

(22) Filed: Apr. 25, 2006

(65) Prior Publication Data

US 2007/0260783 A1 Nov. 8, 2007

(51) Int. Cl.
G06F 13/38 (2006.01)
(52) U.S. Cl. .............. 710/62; 710/8; 710/9; 710/10; 715/847
(58) Field of Classification Search .......... 710/65, 710/72, 62, 63, 15–18, 8–10, 67; 713/300, 713/313, 320; 715/847
See application file for complete search history.

(56) References Cited

U.S. PATENT DOCUMENTS

| | | | |
|---|---|---|---|
| 5,767,844 A | 6/1998 | Stoye | |
| 5,799,196 A | 8/1998 | Flannery | |
| 5,844,086 A | 12/1998 | Murray | |
| 5,938,770 A | 8/1999 | Kim | |
| 6,000,042 A | 12/1999 | Henrie | |
| 6,105,097 A | 8/2000 | Larky et al. | |
| 6,128,743 A | 10/2000 | Rothenbaum | |
| 6,147,682 A | 11/2000 | Kim | |
| 6,170,062 B1 | 1/2001 | Henrie | |
| 6,175,530 B1 | 1/2001 | Theron et al. | |
| 6,189,040 B1 | 2/2001 | Oohara | |
| 6,205,502 B1 | 3/2001 | Endo et al. | |
| 6,282,591 B1* | 8/2001 | Ohtsuka | 710/65 |
| 2006/0069840 A1* | 3/2006 | Corbett et al. | 710/313 |
| 2006/0136758 A1* | 6/2006 | Yoon | 713/300 |
| 2007/0032098 A1* | 2/2007 | Bowles et al. | 439/11 |

FOREIGN PATENT DOCUMENTS

| | | | |
|---|---|---|---|
| JP | 2005-025405 | * | 1/2005 |
| TW | 460766 | * | 10/2001 |

* cited by examiner

Primary Examiner — Tammara R Peyton
(74) Attorney, Agent, or Firm — Garvey, Smith, Nehrbass & North LLC

(57) ABSTRACT

A USB host/client system includes a USB host device, a USB client device connected via a USB cable to the USB host device, and a power supply unit remote from the USB host device for powering the USB host device through the USB cable connecting the USB client device to the USB host device. The USB host device can have means for communicating with a computer while the USB host device is connected to a USB client device, and/or the power supply unit supplies sufficient power for all normal operations of the USB host device.

17 Claims, 4 Drawing Sheets

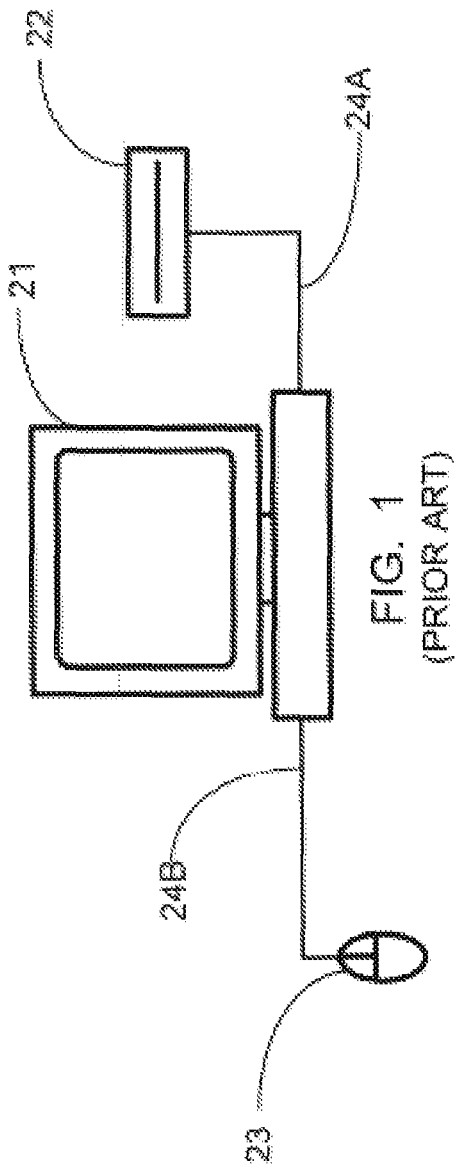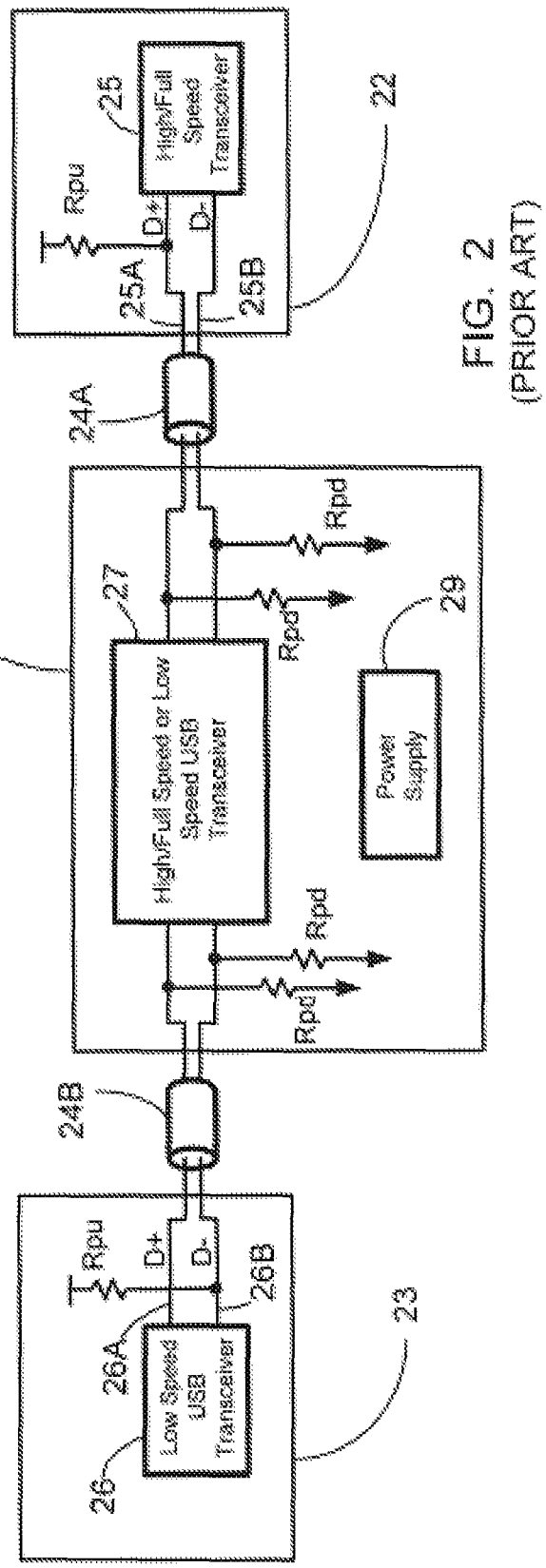
FIG. 1 (PRIOR ART)
FIG. 2 (PRIOR ART)

DETECTING BY USB CLIENT DEVICE A CONNECTION TO HOST USB DEVICE WHEREIN POWER IS NOT SUPPLY FROM HOST USB DEVICE TO USB CLIENT DEVICE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to universal serial bus (USB) devices. More particularly, the present invention relates to USB devices having unique power sharing capabilities.

2. General Background of the Invention

Normally, USB host devices provide power to USB client devices. The USB specification does not entertain the option of the USB client detecting and providing power to the host device.

USB interface version 2.0 specifies that USB host devices be able to provide power to a USB client device. Self-powered USB client devices typically use the power pin to detect the presence of a host USB device.

A USB host device has resistive pull-downs (15K ohm) on both the D+ and D− signal lines. Typically a high/full-speed USB client device has a pull-up resistor (1.5K ohm) on the D+ line. A low-speed USB client device uses a pull-up resistor on the D− signal line. A high-speed USB client device uses a pull-up resistor on the D+ signal line. Part of the enumeration process for USB is deciding if the client is a high-speed device, full-speed device, or a low-speed device. When power is applied by the host device through the VBUS signal, the D+ and D− signals are either high/full speed or low-speed depending on the configuration of the pull-up resistor for the USB client device.

When the D+ signal is high (4.5V) and the D− is low, the speed of the USB client device is high/full speed (printer, scanner, etc.). When the D+ signal is low and the D− signal is high (4.5V), the speed of the USB client device is low (mouse, keyboard, etc.).

The following U.S. Patents, discussed below, are incorporated herein by reference: U.S. Pat. Nos. 5,767,844; 5,799,196; 5,844,086; 5,938,770; 6,000,042; 6,105,097; 6,128,743; 6,147,682; 6,170,062; 6,175,530; 6,189,040; and 6,205,502.

U.S. Pat. No. 5,767,844 discloses a modified USB interface for allowing remote power up of a computer while permitting normal remote power down.

U.S. Pat. No. 5,799,196 discloses a system for powering a computer in sleep mode by a USB device via a USB port (see especially claims 6 and 12; see also claims 7-10).

U.S. Pat. No. 5,844,086 discloses a system in which non-standard voltages can be supplied through a USB cable to a USB client device.

U.S. Pat. No. 5,938,770 discloses a computer monitor which has USB ports and can supply power to USB devices connected thereto.

U.S. Pat. No. 6,000,042 discloses a USB controller with a fault detection circuit.

U.S. Pat. No. 6,105,097 discloses a system for interconnecting USB devices (such as two computers) and managing the power consumed by each.

U.S. Pat. No. 6,128,743 discloses a USB hub for interconnecting multiple USB devices with a USB host. The USB hub can be powered by the host or with its own power supply.

U.S. Pat. No. 6,147,682 is similar to U.S. Pat. No. 5,938,770 and discloses a computer monitor which has USB ports and can supply power to USB devices connected thereto.

U.S. Pat. No. 6,170,062 is a division of U.S. Pat. No. 6,000,042 and also discloses a USB controller with a fault detection circuit.

U.S. Pat. No. 6,175,530 discloses a system in which a low power condition on an FPGA interface device interconnecting a target FPGA device and host system is detected via a USB connection, and power is supplied to the FPGA interface device by the target FPGA device. However, the power is not supplied by the target FPGA device through a USB cable.

U.S. Pat. No. 6,189,040 discloses a data controller which interconnects a host computer with a plurality of client devices and directs transmission of data between the client devices.

U.S. Pat. No. 6,205,502 discloses a USB controller with a switch to allow multiple USB devices to be plugged into the controller and recognized by the USB host after flipping of the switch.

BRIEF SUMMARY OF THE INVENTION

There is a need to have USB client devices provide power to a USB host device yet still follow the USB specification of allowing a powered USB host to be attached. An example of a USB host device that should be powered by the USB client is a network adapter connected to a printer. This is particularly relevant if the network adapter is wireless (RF or infrared based).

By using an additional device or module to detect the presence of a connected but un-powered USB host device, power could be applied to the USB VBUS pin to power up the USB host device and provide the USB client device the proper indication that a powered USB host device has been plugged in.

The present invention allows for a USB client device to detect and provide power to a USB host device.

The present invention includes a USB host/client system comprising a USB host device, having a USB port for connection to a USB client device; a USB client device connected via a USB cable to the USB host device; and a power supply unit remote from the USB host device for powering the USB host device through the USB cable connecting the USB client device to the USB host device. The USB host device can have means (such as a wireless infrared connection, a wireless radio frequency (RF) connection, a USB cable, or network interface) for communicating with a computer while the USB host device is connected to a USB client device. The USB host device can be a device having a wireless connection to a computer. The USB client device can be a printer. The USB host device can be a network adapter. Preferably, the power supply unit supplies sufficient power for all normal operations of the USB host device. Preferably, the power supply unit is integral with the USB client device.

The present invention also includes a USB host/client system comprising a USB host device; having a USB port for connection to a USB client device; a USB client device connected via a USB cable to the USB host device; and a power supply unit remote from the USB host device for powering the USB host device through the USB cable connecting the USB client device to the USB host device, wherein the power supply unit supplies sufficient power for all normal operations of the USB host device. The USB host device can be a device having a wireless connection to a computer. The USB client device can be a printer. The USB host device can be a network adapter. Preferably, the USB host device has means (such as a wireless infrared connection, a wireless RF connection, a USB cable, or network interface) for communicating with a computer while the USB host device is connected to a USB client device. Preferably, the power supply unit is integral with the USB client device. Preferably, circuitry is included for detecting when the USB host device is connected to the USB client device but is not powered by a power supply in the USB host device, and causing the power supply unit to supply power to the USB host device; and detecting when the USB host device is connected to the USB client device and is powered by a power supply in the USB host device, and causing the power supply unit to not supply power to the USB host device.

The present invention includes a module for facilitating use of the USB host devices and USB client devices, comprising electronic circuitry to detect an un-powered USB host device connected to a USB client device, the USB host device having a USB VBUS pin; and a power supply unit remote from the USB host device for connection to the USB VBUS pin to power the USB host device and provide the USB client device a proper indication that a powered USB host device has been plugged in. Preferably, this module is integral with the USB client device.

The present invention includes a method of facilitating use of USB host devices and USB client devices, comprising in or in conjunction with a USB client device, using an additional device or module to detect the presence of a connected but un-powered USB host device having a USB VBUS pin; and applying power to the USB VBUS pin to power up the USB host device and provide the USB client device a proper indication that a powered USB host device has been plugged in.

In many embodiments of the present invention, the USB client device can be a printer and the USB host device can be a wireless network adapter.

Preferably the module of the present invention is integral with the USB client device, which is preferably a printer.

The USB client device of the present invention could be a low-speed device, but preferably is a high/full speed device.

Most likely, the host device must be modified to accept power from the adapter module of the present invention.

BRIEF DESCRIPTION OF THE SEVERAL VIEWS OF THE DRAWINGS

For a further understanding of the nature, objects, and advantages of the present invention, reference should be made to the following detailed description, read in conjunction with the following drawings, wherein like reference numerals denote like elements and wherein:

FIG. 1 shows a prior art arrangement of a high/full-speed USB client device connected to a USB host device through a USB cable and a low-speed USB client device connected to the USB host device through a USB cable;

FIG. 2 is a schematic diagram of the prior art showing a high/full-speed USB client device connected to a USB host device through a USB cable and a low-speed USB client device connected to the USB host device through a USB cable;

DETAILED DESCRIPTION OF THE INVENTION

Figure 3:
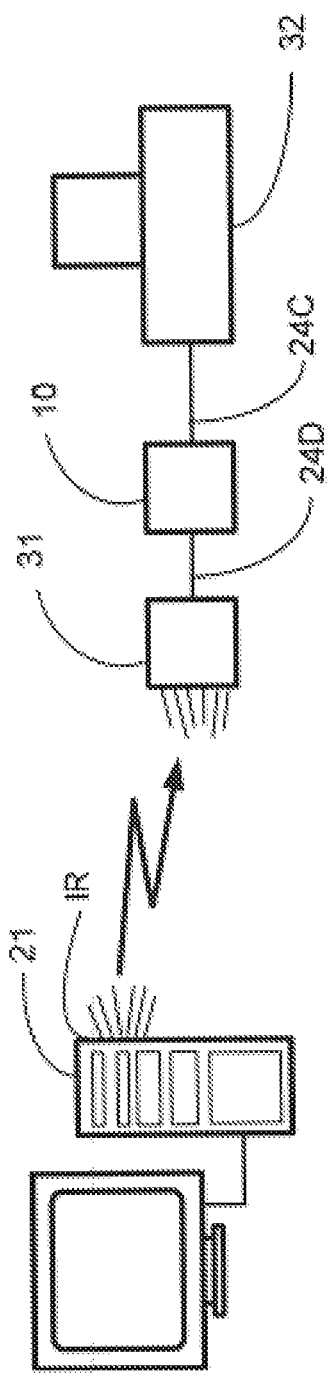
FIG. 3 shows an adapter module embodiment of the present invention, connected with USB cables between a printer and a wireless network adapter for the printer.

By using an additional device or module 10 (see FIGS. 3 and 4) to detect the presence of a connected but un-powered USB host device, power could be applied to the USB VBUS pin to power the USB host device and provide the USB client device the proper indication that a powered USB host device has been plugged in. As used herein, the term "transceiver" means either a physical layer under USB Specification 2.0 or a transceiver device under USB Specification 1.1.

FIG. 1 shows a high/full-speed USB client device 22 (a scanner) connected to a USB host device 21 (a personal computer e.g., and, for example, one available for home or office use from Dell Computer Corporation) through a USB cable 24A and a low-speed USB client device 23 (a mouse) connected to the USB host device through a USB cable 24B.

FIG. 2 is a schematic diagram of the prior art showing scanner 22 having a high/full speed USB transceiver 25 with signal line D+ 25A and signal line D− 25B connected to host PC 21 through USB cable 24A with a pull-up resistor Rpu connected to the D+ signal line of transceiver 25. Also connected to host PC 21 is a mouse 23 having a low speed USB transceiver 26 having D+ and D− signal lines 26A, 26B connected to PC 21 through USB cable 24B with pull-up resistor Rpu connected to the D− signal line of transceiver 26. At host PC 21 is a high/full speed or low speed transceiver 27 with pull-down resistors Rpd connected to each of the D+ and D− signal lines to which transceiver 27 is connected, as well as power supply 29.

FIG. 3 shows an adapter module 10 of the preferred embodiment of the present invention, connected with USB cables 24C and 24D between a printer 32 (such as Lexmark® Model Z53, Model Z33, or Model Z13) and a wireless network adapter 31 for the printer 32. In FIG. 3 host PC 21 includes an infrared transponder IR.

Figure 4:
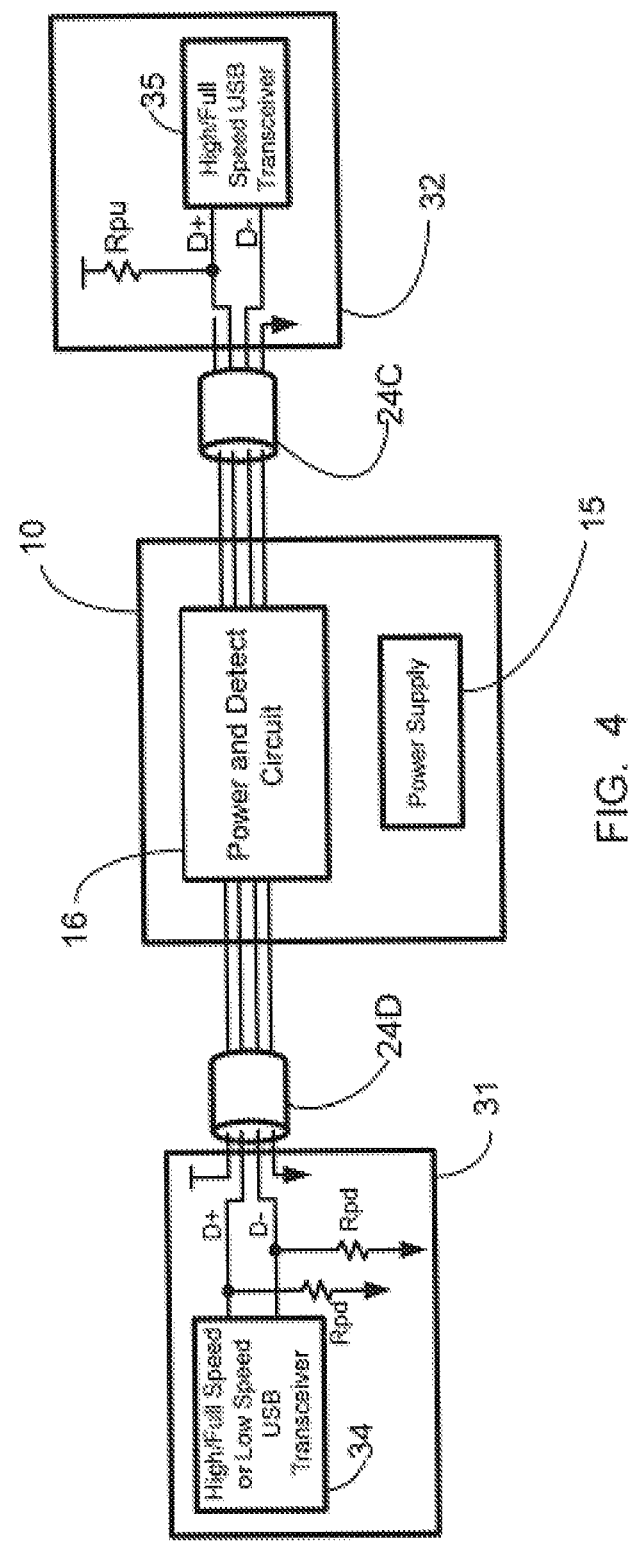
FIG. 4 is a schematic diagram showing an adapter module of the preferred embodiment of the present invention, connected with USB cables between a printer and a network adapter (which could be wireless) for the printer.

FIG. 4 is a schematic diagram showing an adapter module 10 illustrative of the present invention. FIG. 4 shows both a host and a client USB adapter with pull-down and pull-up resistors for a high/full-speed USB client configuration. Adapter module 10 is connected with USB cable 24C to printer 32 and with USB cable 24D to external network adapter 31 for the printer 32. External network adapter 31 includes a high/full speed or low speed USB transceiver 34 having pull-down resistors Rpd connected to signal lines D+ and D−. Printer 32 includes a high/full speed USB transceiver 35 having signal lines D+ and D− with a pull-up resistor Rpu connected to signal line D+. Adapter module 10 includes a 5V power supply 15 and a power and detection circuit 16 communicatively connected to the USB cables 24C and D.

Figure 5:
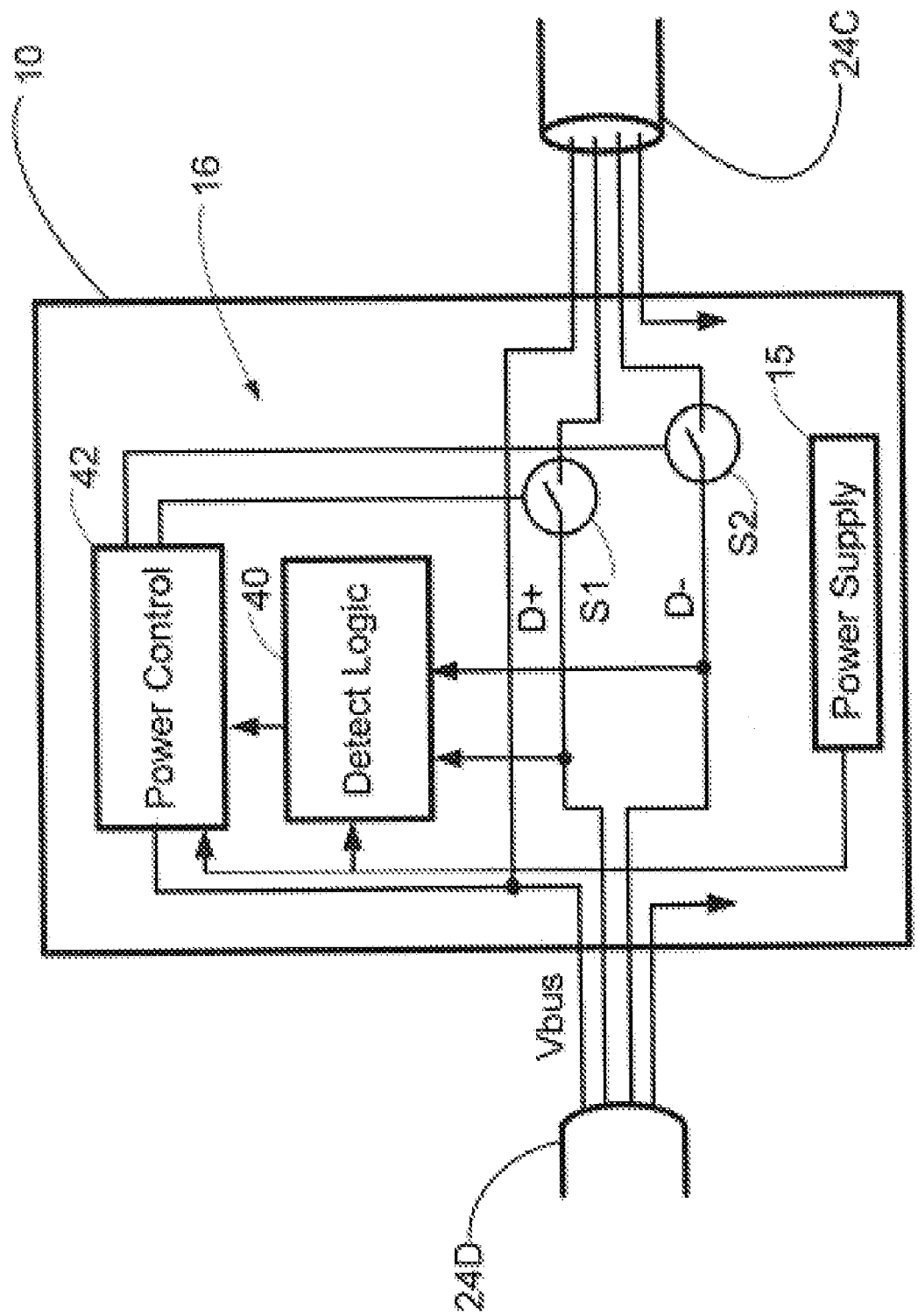
FIG. 5 is a schematic diagram showing circuitry which could be used in the detection and power circuit of the adapter module of the present invention.

FIG. 5 is a schematic diagram illustrating circuitry which could be used in the detection and power circuit of the adapter module 10 of the present invention. Detect logic circuit 40 is communicatively coupled to signal lines D+ and D− and is used to sense the presence of a signal on these lines. Detect logic circuit 40 is also communicatively coupled to a power control circuit 42 which is used to provide power to an unpowered USB host device when connected to adapter module 10. Power control circuit 42 also controls the operation of switches S1 and S2 in signal lines D+ and D− respectively as described with regard to FIG. 6. A power supply 15 can also be provided in adapter module 10 and be used to power the unpowered USB host device and the adapter module 10. Also, provided that the power supply (not shown) in the client device has sufficient capacity, power can be supplied from the USB client device to power the adapter module 10 and the unpowered USB host device 31.

The addition of adapter module 10 would detect and isolate the D+/− lines from the client adapter in printer 32 and detect the presence of a plugged in but un-powered host adapter in external network adapter 31. Once detected, power would be applied to the VBUS pin and the D+/− lines would be connected. This would provide the effect of plugging in a powered host adapter to the client while providing power to the host.

In order to maintain power to the host device, the detection logic would also look to make sure the host device was still connected. One way to do this would be to detect the Start of Frame (SOF) information that an active USB host sends every one millisecond.

Figure 6:
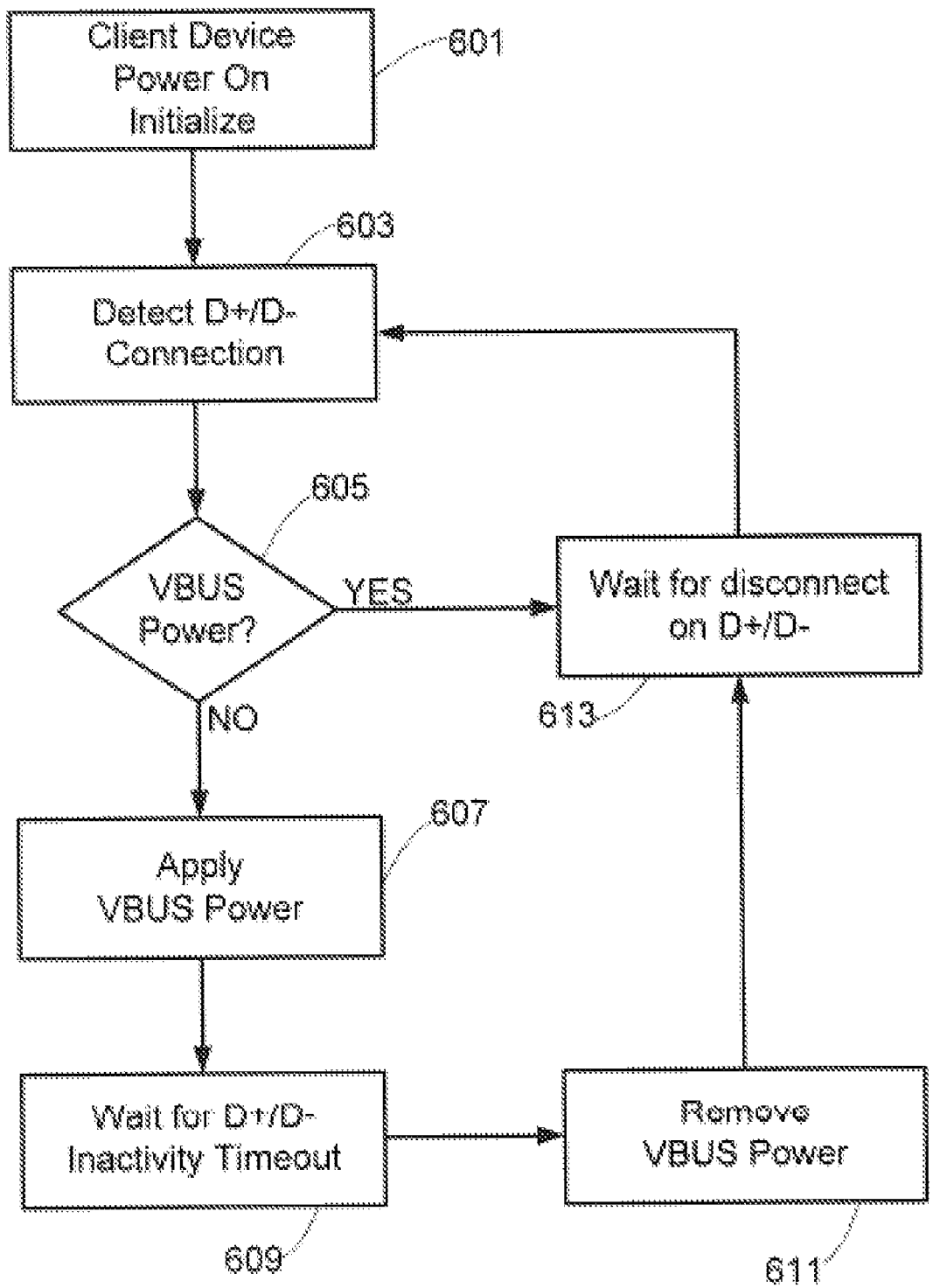
FIG. 6 is a flow chart illustrating the detection circuit logic and power logic of the adapter module of the present invention.

FIG. 6 illustrates a flow chart of the detect logic and power logic of adapter module 10. At block 601 the client device is powered on or initialized. At block 603 adapter module 10 then detects a connection signal on either of the signal lines D+ and D−. At block 605 the presence of VBUS power is determined. If a current path from D+ or D − signal to ground exists for some period of time (250 ms, e.g.) and VBUS Power is not present, then, at block 607, VBUS (5 volts) power is applied to the unpowered host adapter 31, and, at block 609, inactivity of the D+ or D− signal lines is monitored by either monitoring the SOF signal from the USB host device or if removal of current path on signal lines D+ or D− is detected. If the signal lines D+ or D− are inactive, VBUS power is removed at block 611, the adapter module then waits for a disconnect on signal lines D+ and D− at block 613 and then returns to detecting a D+ or D− signal line connection at block 603. If, at block 605, VBUS power is present, then the adapter module waits for a disconnect on signal lines D+ and D− at block 613. The process returns to block 603 monitoring the D+ and D− signal line connections.

This logic would still allow a powered host to be connected. The detection logic would hold off because of the presence of 5 volts on the VBUS line yet the power logic would still connect the D+/− signal lines using switches S1 and S2, respectively. The detection of VBUS power supplied by either the adapter module 10 or the USB host device 31, would allow the power logic to close switches S1 and S2.

The foregoing embodiments are presented by way of example only; the scope of the present invention is to be limited only by the following claims.

What is claimed is:

1. A USB host/client system comprising:
    a USB client device having a port for connection via a USB cable to a USB host device;
    a power supply unit remote from the USB host device for powering the USB host device through the USB cable connecting the USB client device to the USB host device; and
    circuitry, separate from the USB host device, for detecting when the USB host device is connected to the USB client device but is not powered by a power supply in the USB host device, and when detected causing the power supply unit to supply power to the USB host device, and detecting when the USB host device is connected to the USB client device and is powered by a power supply in the USB host device, and when detected causing the power supply unit to not supply power to the USB host device.

2. The system of claim 1, wherein the USB client device is a printer.

3. The system of claim 1, wherein the power supply unit supplies sufficient power for all normal operations of the USB host device.

4. The system of claim 1, further comprising circuitry connected to the USB client device and the power supply, for selectively providing power from the power supply unit to the USB host device upon a determination that the USB host device is not otherwise powered.

5. The system of claim 4, wherein the circuitry removes power from the USB host device upon a determination that the USB host device has been inactive for a predetermined period of time.

6. The system of claim 5, wherein the circuitry determines that the USB host device has been inactive by monitoring activity on data lines coupled to the port of the USB client device.

7. A USB host/client system comprising:
    a USB client device having a port for connection via a USB cable to a USB host device;
    a power supply unit remote from the USB host device for powering the USB host device through the USB cable connecting the USB client device to the USB host device wherein the power supply unit supplies sufficient power for all normal operations of the USB host device; and
    circuitry for detecting when the USB host device is connected to the USB client device but is not powered by a power supply in the USB host device, and when detected causing the power supply unit to supply power to the USB host device through the USB cable connecting the USB client device to the USB host device, and detecting when the USB host device is connected to the USB client device and is powered by a power supply in the USB host device, and when detected causing the power supply unit to not supply power to the USB host device.

8. The system of claim 7, wherein the USB client device is a printer.

9. The system of claim 7, wherein the power supply unit is integral with the USB client device.

10. The system of claim 7, further comprising circuitry coupled to the USB client device and the power supply for selectively providing power to the USB host device through the USB cable upon a determination that the USB host device is not otherwise powered.

11. The system of claim 10, wherein the circuitry removes power to the USB host device upon a determination that the USB host device has been inactive for a predetermined period of time.

12. A module for facilitating use of a USB host device and a USB client device, comprising:
    electronic circuitry to detect an unpowered USB host device connected to a USB client device, the USB host device having a USB VBUS pin coupled to the USB client device when the USB host device is connected thereto; and
    a power supply unit remote from the USB host device connectable to the USB VBUS pin to power the USB host device following the detection by the electronic circuitry, the module providing the USB client device a proper indication that a powered USB host device has been plugged in;

wherein the electronic circuitry removes power to the USB host device from the power supply upon a determination that the USB host device has been inactive for a period of time.

13. The module of claim 12, wherein said module is integral with the USB client device.

14. A method of facilitating use of USB host device and a USB client device, comprising:

detecting the presence of a connected but unpowered USB host device having a USB VBUS pin;

applying power from a power supply remote from the USB host device to the USB VBUS pin to power up the USB host device, responsive to the detection;

providing the USB client device a proper indication that a powered USB host device has been plugged in; and removing power from the USB host device if the USB host device has been inactive for a predetermined period of time.

15. The method of claim 14, wherein the USB client device is a printer and the USB host device is a wireless network adapter.

16. The method of claim 14, wherein the inactivity is determined by one of monitoring the SOG signal from the USB host device and detecting removal of the current path on signal line D+ or D− of the USB host device.

17. The method of claim 14, wherein the applying power comprises applying power to the USB host device over the connection between the USB host device and the USB client device.

* * * * *